United States Patent
Lafore et al.

(10) Patent No.: US 7,781,556 B2
(45) Date of Patent: Aug. 24, 2010

(54) LYOTROPIC LIQUID CRYSTALS AND VESICLES

(75) Inventors: Michael Richard Lafore, Freeland, MI (US); Zuchen Lin, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 11/990,423

(22) PCT Filed: Jul. 28, 2006

(86) PCT No.: PCT/US2006/029194

§ 371 (c)(1),
(2), (4) Date: Feb. 13, 2008

(87) PCT Pub. No.: WO2007/021486

PCT Pub. Date: Feb. 22, 2007

(65) Prior Publication Data

US 2009/0111963 A1     Apr. 30, 2009

Related U.S. Application Data

(60) Provisional application No. 60/709,023, filed on Aug. 17, 2005.

(51) Int. Cl.
  *C08G 77/06*    (2006.01)
(52) U.S. Cl. .......................... 528/15; 528/31
(58) Field of Classification Search .............. 528/15, 528/31
See application file for complete search history.

(56) References Cited

U.S. PATENT DOCUMENTS

| 3,419,593 A | 12/1968 | Willing |
| 3,715,334 A | 2/1973 | Karstedt |
| 3,814,730 A | 6/1974 | Karstedt |
| 3,923,705 A | 12/1975 | Smith |
| 5,623,017 A | 4/1997 | Hill |
| 5,811,487 A * | 9/1998 | Schulz et al. ................ 524/862 |
| 2003/0220425 A1 * | 11/2003 | Ferritto et al. ............... 524/266 |

FOREIGN PATENT DOCUMENTS

| WO | WO 2005/103117 A1 | 11/2005 |
| WO | WO 2005/103118 A1 | 11/2005 |
| WO | WO 2005/103157 A1 | 11/2005 |

* cited by examiner

*Primary Examiner*—Ling-Siu Choi
*Assistant Examiner*—Chun-Cheng Wang
(74) *Attorney, Agent, or Firm*—Alan Zombeck

(57) ABSTRACT

Silicone based liquid crystal and vesicles are prepared by first reacting (A) an ≡Si—H containing polysiloxane, (B) a mono-alkenyl polyether, in the presence of a platinum catalyst until an ≡Si—H containing polysiloxane with polyether groups (C) is formed. The ≡Si—H containing polysiloxane with polyether groups (C) is then reacted with (D) an unsaturated hydrocarbon such as an α,ω-dienes, and (E) water, in the presence of a platinum catalyst until the silicone based liquid crystal or vesicle is formed. The silicone based liquid crystal or vesicle can also be heated until a hard liquid crystal gel or vesicle paste are formed.

8 Claims, No Drawings

LYOTROPIC LIQUID CRYSTALS AND VESICLES

CROSS REFERENCE TO RELATED APPLICATIONS

This application is a U.S. national stage filing under 35 U.S.C. §371 of PCT Application No. PCT/US06/029194 filed on 28 Jul. 2006, currently pending, which claims the benefit of U.S. Provisional Patent Application No. 60/709,023 filed 17 Aug. 2005 under 35 U.S.C. §119 (e). PCT Application No. PCT/US06/029194 and U.S. Provisional Patent Application No. 60/709,023 are hereby incorporated by reference.

BACKGROUND OF THE INVENTION

Silicone polyethers are commonly used as surfactants. Surfactants are useful because they absorb at interfaces to lower surface and interfacial tension. Surfactants also self-associate in water to form a variety of aggregates, ranging from globular, wormlike, and disc-like micelles, to bilayer structures such as vesicles. Attractive interaction between the aggregates can lead to condensation to, for example, liquid crystal phases or so-called lyotropic liquid crystals. Knowledge therefore of surfactant self-association is important because it controls the rheology and freeze-thaw stability of the formulations, and their ability to form and stabilize emulsions and microemulsions. The stability of microstructures such as these however, depends on temperature, water contents, salt and the presence of other surfactants. By crosslinking according to the present invention, the dependency can be eliminated.

A typical silicone elastomer blend such as prepared according to U.S. Pat. No. 5,811,487 (Sep. 22, 1998), i.e., the '487 patent hereafter, will not result in ordered microstructures such as liquid crystals and vesicles. The process according to the '487 patent will not result in liquid crystals and vesicles because the crosslinking Step 2 in the '487 patent is carried out in the presence of a solvent, and this inherently results in the production of crosslinked elastomers instead of liquid crystals and/or vesicles. On the other hand, the process according to this invention will not result in crosslinked elastomers, because the crosslinking Step 2 is carried out in the presence of water instead of in the presence of a solvent as in the '487 patent.

BRIEF SUMMARY OF THE INVENTION

The invention is directed to a method of making a silicone based liquid crystal or vesicle. The method is essentially carried out in two steps. The first step comprises reacting:

(A) an $\equiv$Si—H containing polysiloxane (i) of the formula $R_3SiO(R'_2SiO)_a(R''HSiO)_bSiR_3$, (ii) of the formula $HR_2SiO(R'_2SiO)_cSiR_2H$, or (iii) the formula $HR_2SiO(R'_2SiO)_a(R''HSiO)_bSiR_2H$, where in the formulas, R, R', and R", are alkyl groups with 1-6 carbon atoms; a is 0-250; b is 1-250; and c is 0-250; and (B) a mono-alkenyl polyether of the formula $CH_2=CH(CH_2)_xO(CH_2CH_2O)_y[CH_2CH(CH_3)O]_zR$, in which R represents hydrogen or an alkyl group containing 1-10 carbon atoms; x is 1-6; y is zero or has a value of 4-100; z is zero or has a value of 4-100; provided y or z are both not zero; in the presence of a platinum catalyst until an $\equiv$Si—H containing polysiloxane with polyether groups is formed.

The second step comprises reacting:

(C) the $\equiv$Si—H containing polysiloxane with polyether groups;

(D) an unsaturated hydrocarbon selected from the group consisting of α,ω-dienes having the formula $CH_2=CH(CH_2)_xCH=CH_2$ where x is 1-20; α,ω-diynes of the formula $CH\equiv C(CH_2)_xC\equiv CH$ where x is 1-20; and α,ω-ene-ynes of the formula $CH_2=CH(CH_2)_xC\equiv CH$ where x is 1-20; and (E) water; in the presence of a platinum catalyst until a silicone based liquid crystal or vesicle is formed.

The second step can include (F) heating the silicone based liquid crystal or vesicle until a hard liquid crystal gel or vesicle paste are formed. A solvent or a buffer may also be present during the first step of reacting (A), (B), and the platinum catalyst, but both the solvent and the buffer are removed before second step of reacting (C), (D), (E), and the platinum catalyst. The second step is also free of the presence of any other component having surfactant properties. These and other features of the invention will become apparent from a consideration of the detailed description.

DETAILED DESCRIPTION OF THE INVENTION

The process according to this invention can be illustrated with reference to the reaction scenario shown below.

Step 1: Incorporation of the Polyether $\equiv$SiH siloxane+mono-alkenyl polyether+Pt→$\equiv$SiH siloxane with polyether groups Step 2: Crosslinking $\equiv$SiH siloxane with polyether groups+α,ω-diene+water+Pt→liquid crystal or vesicle Step 3: Optional Heating liquid crystal or vesicle+heat→hard liquid crystal gel or vesicle paste In Step 1, the molar ratio of the polyether to the $\equiv$SiH in the $\equiv$SiH siloxane should be more than zero and less than one. In Step 2, the weight ratio of water to the weight of the $\equiv$SiH siloxane with polyether groups and the α,ω-diene can be from 1-98, but preferably is between 3-10. In optional Step 3, the liquid crystal or vesicle solutions can be heated for about three hours at a temperature of about 80° C., to obtain the hard gel form of the liquid crystal and the paste form of the vesicle.

As noted above, one advantage of the method according to the present invention is that dependency on the presence of other surfactants can be eliminated by crosslinking in Step 2 according to the method herein. Thus, the reaction of the $\equiv$SiH siloxane with polyether groups, the α,ω-diene, water, and the platinum catalyst, is free of the presence of any other component having surfactant properties.

The $\equiv$Si—H Containing Polysiloxane

The $\equiv$Si—H containing polysiloxane is a composition that can include compounds of the formula $R_3SiO(R'_2SiO)_a(R''HSiO)_bSiR_3$, compounds of the formula $HR_2SiO(R'_2SiO)_cSiR_2H$, or compounds of the formula $HR_2SiO(R'_2SiO)_a(R''HSiO)_bSiR_2H$. In the three formulas, R, R', and R", are alkyl groups with 1-6 carbon atoms; a is 0-250; b is 1-50; and c is 0-250. The $\equiv$Si—H containing polysiloxane can also comprise an alkylhydrogen cyclosiloxane or an alkylhydrogen-dialkyl cyclosiloxane copolymer, represented in general by the formula $(R'_2SiO)_a(R''HSiO)_b$ where R', R", a, and b, are as defined above. Preferably, a is 0-7; and b is 3-10. Some representative compounds are $(OSiMeH)_4$, (OSiMeH)$_3$ (OSiMeC$_6$H$_{13}$), (OSiMeH)$_2$(OSiMeC$_6$H$_{13}$)$_2$, and (OSiMeH)(OSiMeC$_6$H$_{13}$)$_3$, where Me is —CH$_3$. These compositions are available commercially from chemical suppliers such as the Dow Corning Corporation, Midland, Mich.

The Mono-Alkenyl Polyether

Polyethers, often referred to in the art synonymously as polyols, polyglycols, and polyalkylene glycols, preferred for use according to the invention, are hydroxy and/or alkoxy terminated polyether compositions having a formula generally corresponding to CH$_2$=CH(CH$_2$)$_x$O(CH$_2$CH$_2$O)$_y$[CH$_2$CH(CH$_3$)O]$_z$R, in which R represents hydrogen or an alkyl group containing 1-10 carbon atoms; x is 1-6; y is zero or has a value of 4-100; z is zero or has a value of 4-100; provided y or z are both not zero. While alkyl groups containing 1-10 carbon atoms are preferred, larger alkyl groups containing up to about 20 carbon atoms may be used. Compositions suitable for use herein will generally have a weight average molecular weight (Mw) of about 200-2,500 or more, preferably about 300-800. The compositions may contain only oxyethylene groups, only oxypropylene groups, or oxyethylene and oxypropylene groups. These compositions are commercially available from chemical suppliers such as The Dow Chemical Company, Midland, Mich., and the Clariant Corporation, Charlotte, N.C.

The Crosslinking Agent

The crosslinking agent can be an unsaturated hydrocarbon such as an α,ω-diene having the formula CH$_2$=CH(CH$_2$)$_x$CH=CH$_2$ where x is 1-20. Some suitable α,ω-dienes for use herein include 1,4-pentadiene; 1,5-hexadiene; 1,6-heptadiene; 1,7-octadiene; 1,8-nonadiene; 1,9-decadiene; 1,11-dodecadiene; 1,13-tetradecadiene; and 1,19-eicosadiene. Other unsaturated hydrocarbons can also be used such as α,ω-diynes of the formula CH≡C(CH$_2$)$_x$C≡CH; or α,ω-ene-ynes of the formula CH$_2$=CH(CH$_2$)$_x$C≡CH where x is 1-20. Some suitable α,ω-diynes for use herein include 1,3-butadiyne HC≡C—C≡CH and 1,5-hexadiyne HC≡C—CH$_2$CH$_2$—C≡CH. A suitable α,ω-ene-yne for use herein is hex-5-en-1-yne CH$_2$=CHCH$_2$CH$_2$C≡CH.

The Catalyst

The catalysts usable herein are Group VIII transition metals, i.e., the noble metals. Such noble metal catalysts are known and described for example in U.S. Pat. No. 3,923,705 (Feb. 2, 1975), incorporated herein by reference, to show platinum catalysts. One preferred platinum catalyst is Karstedt's catalyst, described in U.S. Pat. No. 3,715,334 (Feb. 6, 1973) and U.S. Pat. No. 3,814,730 (Jun. 4, 1974), also incorporated herein by reference. Karstedt's catalyst in particular is a platinum divinyl tetramethyl disiloxane complex typically containing about one weight percent of platinum, and carried in a polydimethylsiloxane fluid or solvent such as toluene. Another preferred platinum catalyst is the reaction product of chloroplatinic acid and an organosilicon compound containing terminal aliphatic unsaturation. It is described in U.S. Pat. No. 3,419,593 (Dec. 31, 1968), additionally incorporated herein by reference. These noble metal catalysts are used in amounts from 0.00001-0.5 parts per 100 weight parts of ≡SiH containing polysiloxane, preferably 0.00001-0.02 parts, most preferably 0.00001-0.002 parts.

Water

Water is used in Step 2 instead of a solvent. The amount of water used in Step 2 can generally range from 65-98 percent by weight, but is preferably about 80-98 percent by weight, based on the total amount of components used in the reaction.

Other Components for Step 1

Other components can be added to the hydrosilylation reaction in Step 1 for preparing the silicone polyether which enhance the reaction. For example, a solvent can be used, preferably an organic compound such as an alcohol or an aromatic hydrocarbon. Some representative alcohols include methanol, ethanol, propyl alcohol, isopropanol (IPA), cyclohexanol, benzyl alcohol, 2-octanol, ethylene glycol, propylene glycol, and glycerol; and some representative aromatic hydrocarbons include benzene, toluene, ethylbenzene, and xylene. The amount of solvent used in Step 1 can be from 1-50 percent by weight, based on the total weight of the components in the hydrosilylation reaction, but the amount is typically 20-50 percent by weight. Another component that can be included in Step 1 is a salt such as sodium acetate, which have a buffering effect when used in combination with platinum based catalysts.

In this regard, it is noted that hydrosilylation reactions such as Step 1 typically use solvents such as IPA to compatiblize the ≡Si—H containing polysiloxane and the mono-alkenyl polyether during the reaction. The solvent also aids the reaction by lowering the viscosity of the reaction mixture. A side benefit to using a solvent is that the solvent acts as a heat-sink to help control the exotherm from the reaction. This is generally common in such hydrosilylation reactions.

Salts such as sodium acetate can also be added as buffers in Step 1 to slow the reverse addition that may occur during the hydrosilylation reaction. For example, while the desired product is obtained by the reaction of ≡Si—H groups of the polysiloxane with the unsaturated end group of the mono-alkenyl polyether, the ≡Si—H groups can react with either end group of the polyether. When some ≡Si—H groups react for example with the —OH group on the polyether, reverse addition occurs. Reverse addition results in a hydrolytically unstable ≡Si—O—C bond formation rather than the desired the ≡Si—C direct bond. A salt such as sodium acetate reduces the tendency of reverse addition occurring.

As indicated previously, while other components such as solvents and salts can be added to the hydrosilylation reaction in Step 1 when preparing the silicone polyether, they are not used in Step 2 when preparing liquid crystals and/or vesicles according to the invention. In the process of the invention, the crosslinking reaction of the silicone polyether with the alpha, omega-diene is conducted in the presence of water rather than in the presence of a solvent.

EXAMPLES

The following examples are set forth in order to illustrate the invention in more detail.

Example A

General Procedure for Forming the Silicone Polyether

The process is commenced by adding to a 3-neck round bottom flask, the ≡Si—H containing polysiloxane, sodium acetate in an amount of 0.50 percent by weight of the flask contents, and isopropyl alcohol (IPA) in an amount of 10 percent by weight of the flask contents. This solution is mixed for 10 minutes under a nitrogen blanket, accompanied with light stirring, that allows the sodium acetate to dissolve. During this period of time, the mono-alkenyl polyether is added to an addition funnel. The contents in the flask are stirred at a higher rpm for an additional 10 minutes, and heating is started with a set-point of 90° C. The mono-alkenyl polyether in the addition funnel is transferred to the flask in an amount of 10 percent by weight of the flask contents. The flask has continued to heat, and the temperature has risen to between 50-60° C. The flask contents are stirred for 10 minutes allowing the temperature to rise to about 75° C. The platinum catalyst, i.e., consisting of chloroplatinic acid in IPA, is added to the flask.

Immediately, the remainder of the mono-alkenyl polyether in the addition funnel is allowed to drip slowly into the flask. The addition of the mono-alkenyl polyether is continued for 20-30 minutes, or until the mixture turns clear, indicating that the reaction has taken place. If the mixture remains cloudy, a slower addition of the mono-alkenyl polyether is maintained over a one hour period. In either case, when the reaction turns clear, addition of the mono-alkenyl polyether can be increased to a faster drip to feed the reaction. At the same time, stirring should be increased to achieve a small vortex in the flask. The flask contents are mixed for an additional two hours once the mono-alkenyl polyether has been completely added to the flask. During this time, the ≡Si—H content of the formed silicone polyether in the flask is monitored to insure that it has been completely eliminated from the product, or that a target value for a certain amount of residual ≡Si—H content has been attained. Stirring is maintained if the target value has not been attained. Otherwise, application of heat is ceased, and the flask contents are lightly stirred until cooled. The IPA solvent is removed from the contents in the flask by stripping the contents under a full vacuum. Stripping is conducted at a temperature of about 90° C. and at a high stirring rate for about two hours. Once the contents have been stripped, the contents are lightly stirred and allowed to cool. Sodium acetate is then removed by filtering the flask contents through a 10 micron filter paper using Celite 545 filtering powder. The contents are filtered under a pressure of 25 psi for as long as necessary.

Example 1

Reaction of a Dimethylmethylhydrogen Polysiloxane with a Methoxy Terminated Polyether Into a reaction vessel was placed 250 gram of a dimethylmethylhydrogen polysiloxane. Forty gram of isopropyl alcohol (IPA), 0.20 gram of sodium acetate, and 10 percent of the total amount (150 gram) of the methoxy terminated polyether were added. The mixture was stirred with a mechanical stirrer for a period of ten to fifteen minutes. During mixing, the solution was heated to about 85° C. and then catalyzed with a solution of chloroplatinic acid in IPA. The remainder of the methoxy terminated polyether was added over a period of time. The resulting mixture was then stirred for several hours at about 90° C. The resulting fluid was clear and had a gold tint. 2.37 moles of residual SiH were calculated based on calibrated Fourier Transform Infrared Spectroscopy (FTIR) measurements. The material was vacuum stripped to remove all of the IPA solvent, then filtered to remove the sodium acetate.

Example 2

Reaction of a Dimethylmethylhydrogen Polysiloxane with a Hydroxy Terminated Polyether Into a reaction vessel was placed 250 gram of a dimethylmethylhydrogen polysiloxane. Forty gram of isopropyl alcohol (IPA), 0.20 gram of sodium acetate, and 10 percent of the total amount (150 gram) of the hydroxy terminated polyether were added. The mixture was stirred with a mechanical stirrer for a period of ten to fifteen minutes. During mixing, the solution was heated to about 85° C. and then catalyzed with a solution of chloroplatinic acid in IPA. The remainder of the hydroxy terminated polyether was added over a period of time. The resulting mixture was then stirred for several hours at about 90° C. The resulting fluid was clear and had a gold tint. 2.09 moles of residual SiH were calculated based on calibrated FTIR measurements. The material was vacuum stripped to remove all of the IPA solvent, then filtered to remove the sodium acetate.

Example 3

Liquid Crystals 4.94 gram of the material prepared in Example 1, 0.07 gram of 1,5-hexadiene, 1.01 gram of water, and 0.04 gram of the platinum catalyst used in Example 1 were weighed in a vial. The vial was placed on a vortex mixer for a few minutes until clear and uniform. The mixture was placed in an oven at 80° C. oven for 3 hours. A clear hard liquid crystal gel was formed. Polarized optical microscopy confirmed that both the solution before heating and the clear hard liquid crystal gel after heating were liquid crystals.

Example 4

Vesicles 6.09 gram of the material prepared in Example 1, 0.09 gram of 1,5-hexadiene, 12.70 gram of water, and 0.03 gram of the platinum catalyst used in Example 1 were weighed in a vial. The vial was placed on a vortex mixer for a few minutes. Then, 8.13 gram of the mixture and 8.24 gram of water were placed in a vial. The vial was again placed on a vortex mixer for a few minutes. The vial was then placed in an oven at 80° C. for 3 hours. A white paste was formed and separated from the rest of the water. After hand shaking the vial, the white paste was redispersed in water. A Transmission Electron Microscopic (TEM) image indicated that vesicles were present in the white paste dispersion.

Uses

The liquid crystals and vesicles prepared herein have a number of applications. For example, they can be used (i) as delivery vehicles for a number of active ingredients in pharmaceutical and cosmetic applications; (ii) as precursors to templated nano-structured materials; (iii) in areas that thermotropic liquid crystals have been used such as variable focus lens applications; (iv) as polymer dispersed liquid crystals (PDLC); (v) in piezoelectric applications; (vi) in non-linear optical applications; (vii) in sensing technologies; (viii) in targeted release in controlled chemical environments such as plants, microchips, fermentors, and bioreactors: and (ix) in the manipulation of optical axes of birefringence by mechanical means.

Other variations may be made in compounds, compositions, and methods described herein without departing from the essential features of the invention. The embodiments of the invention specifically illustrated herein are exemplary only and not intended as limitations on their scope except as defined in the appended claims.

We claim:
1. A method of making a silicone based liquid crystal or vesicle comprising reacting:
(A) an ≡Si—H containing polysiloxane (i) of the formula $R_3SiO(R'_2SiO)_a(R''HSiO)_bSiR_3$, (ii) of the formula $HR_2SiO(R'_2SiO)_cSiR_2H$, or (iii) the formula $HR_2SiO$

$(R'_2SiO)_a(R''HSiO)_bSiR_2H$, where in the formulas, R, R', and R'', are alkyl groups with 1-6 carbon atoms; a is 0-250; b is 1-50; and c is 0-250; and (B) a mono-alkenyl polyether of the formula $CH_2$=CH $(CH_2)_xO(CH_2CH_2O)_y[CH_2CH(CH_3)O]_zR$, in which R represents hydrogen or an alkyl group containing 1-10 carbon atoms; x is 1-6; y is zero or has a value of 4-100; z is zero or has a value of 4-100; provided y or z are both not zero; in the presence of a platinum catalyst until an ≡Si—H containing polysiloxane with polyether groups is formed;

and then reacting:

(C) the ≡Si—H containing polysiloxane with polyether groups;

(D) an unsaturated hydrocarbon selected from the group consisting of α,ω-dienes having the formula $CH_2$=CH$(CH_2)_xCH$=$CH_2$ where x is 1-20; α,ω-diynes of the formula CH≡C$(CH_2)_x$≡CH where x is 1-20; and α,ω-ene-ynes of the formula $CH_2$=CH$(CH_2)_x$≡CH where x is 1-20; and (E) water;

in the presence of a platinum catalyst until a silicone based liquid crystal or vesicle is formed.

2. A method according to claim 1 including the further step (F) of heating the silicone based liquid crystal or vesicle until a hard liquid crystal gel or vesicle paste are formed.

3. A method according to claim 1 in which a solvent is optionally present during the reaction of (A), (B), and the platinum catalyst, and is removed before the reaction of (C), (D), (E), and the platinum catalyst.

4. A method according to claim 1 in which a buffer is optionally present during the reaction of (A), (B), and the platinum catalyst, and is removed before the reaction of (C), (D), (E), and the platinum catalyst.

5. A method according to claim 1 in which the reaction of (C), (D), (E), and the platinum catalyst is free of the presence of any other component having surfactant properties.

6. A method according to claim 1 in which the molar ratio of the mono-alkenyl polyether to the ≡SiH in the ≡SiH siloxane is more than zero and less than one.

7. A method according to claim 1 in which the weight ratio of water to the weight of the ≡SiH siloxane with polyether groups and the α,ω-diene is 1-98.

8. A method according to claim 7 in which the weight ratio of water to the weight of the ≡SiH siloxane with polyether groups and the α,ω-diene is 3-10.

* * * * *